United States Patent
Broyles et al.

(10) Patent No.: US 6,665,530 B1
(45) Date of Patent: Dec. 16, 2003

(54) SYSTEM AND METHOD FOR PREVENTING REPLAY ATTACKS IN WIRELESS COMMUNICATION

(75) Inventors: Samuel K. Broyles, Jamestown, CO (US); Roy Franklin Quick, Jr., San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/238,126

(22) Filed: Jan. 27, 1999

(30) Foreign Application Priority Data

Jul. 31, 1998 (WO) .............................. PCT/US98/15995

(51) Int. Cl.[7] ............................. H04M 1/66; H04K 1/00
(52) U.S. Cl. ........................ 455/411; 455/410; 380/247
(58) Field of Search ................................ 455/411, 410, 455/403; 380/247, 248, 249, 250, 270, 251; 379/189, 161, 88.02, 93.02, 93.03; 340/825.53

(56) References Cited

U.S. PATENT DOCUMENTS

| | | | | |
|---|---|---|---|---|
| 5,091,942 A | * | 2/1992 | Dent ............................. 380/46 |
| 5,153,919 A | * | 10/1992 | Reeds et al. ................. 380/247 |
| 5,239,294 A | * | 8/1993 | Flanders et al. ......... 340/825.34 |
| 5,402,490 A | * | 3/1995 | Mihm, Jr. .................... 380/247 |
| 5,457,737 A | * | 10/1995 | Wen ............................ 455/410 |
| 5,465,290 A | * | 11/1995 | Hampton et al. ......... 379/88.02 |
| 5,467,382 A | * | 11/1995 | Schorman ................... 455/410 |
| 5,537,474 A | * | 7/1996 | Brown et al. ............... 380/248 |
| 5,541,977 A | * | 7/1996 | Hodges et al. .............. 455/411 |
| 5,555,192 A | * | 9/1996 | Grube et al. ............... 340/7.25 |
| 5,559,886 A | | 9/1996 | Dent et al. .................... 380/23 |
| 5,875,394 A | * | 2/1999 | Daly et al. ................... 455/411 |
| 5,940,512 A | * | 8/1999 | Tomoike ...................... 380/248 |
| 5,943,425 A | * | 8/1999 | Mizikovsky ................. 380/247 |
| 5,991,407 A | * | 11/1999 | Murto .......................... 380/248 |
| 6,014,085 A | * | 1/2000 | Patel ............................ 455/410 |
| 6,026,293 A | * | 2/2000 | Osborn ......................... 455/411 |
| 6,195,547 B1 | * | 2/2001 | Corriveau et al. ........... 455/411 |
| 6,285,871 B1 | * | 9/2001 | Daniels ........................ 455/411 |

FOREIGN PATENT DOCUMENTS

EP        0532231        3/1993

OTHER PUBLICATIONS

Patel, Sarvar "Weaknesses of North America Wireless Authentication Protocol" IEEE Personal Communications: pp. 40–44 (Jun. 1997).

* cited by examiner

*Primary Examiner*—Charles Appiah
(74) *Attorney, Agent, or Firm*—Philip Wadsworth; Charles Brown; Kyong Macek

(57) ABSTRACT

A method and apparatus for confirming the identity of a mobile station in a communication network. A mobile station transmits a security value to obtain access to the network. The system authenticates the mobile station prior to granting it access to the network. The system performs an additional procedure before granting access to the system if the security value sent by the mobile station matches a previously transmitted security value. Using this invention, the system prevents attempts of replay attacks by intruders.

7 Claims, 4 Drawing Sheets

SYSTEM AND METHOD FOR PREVENTING REPLAY ATTACKS IN WIRELESS COMMUNICATION

BACKGROUND OF THE INVENTION

I. Field of the Invention

The invention relates generally to wireless communication systems, such as mobile telephone systems. More particularly, the invention relates to authentication procedures in mobile telephone systems.

II. Description of the Related Art

When a telephone company first introduces cellular communications into an area, its primary focus is to establish capacity, coverage, and to enlist new customers. As its network grows, the telephone company expects to make profit from the use of its equipment by its customers. However, cellular telephone fraud and cloning, in particular, can significantly impact the ability to profitably operate the communication: system. Cloning is the duplication of a legitimate subscriber unit to seize the legitimate subscriber unit's identity and thus acquire unauthorized telephone service. Such activities also create problems and substantial inconveniences for system users. According to the Cellular Telecommunications Industry Association (CTIA), the annual global loss in revenues due to cloning has exceeded one billion dollars.

An authentication procedure is now used to combat fraudulent access to mobile telephone service. As used herein, authentication refers to the exchange and processing of stored information to confirm a subscriber unit's identity. The authentication procedure is performed by a network to validate the identity of a standard-compliant phone unit, such as an IS-54B, IS-136, IS-91, or IS-95 standard phone. Typically, the authentication procedure is independent of the air-interface protocol used (i.e., CDMA or TDMA).

FIG. 1 is a pictorial diagram of a typical mobile communication system having one or more mobile stations. A mobile telephone system (MTS) 100 typically includes infrastructure components 112 communicating with a plurality of mobile stations (MS) 120 using radio frequency (RF) channels. The infrastructure components include a base station (BS) 110, a mobile switching center (MSC) 130, a home location register (HLR) 150, an authentication center (AC) 160, and a visitor location register (VLR) 155. The BS 110 provides the air interface between the MS 120 and the MSC 130. The MSC 130 coordinates all communications channels and processes, and provides access for the BS 110 to networks, such as a public switched telephone network (PSTN) 140. The HLR 150 contains a subscriber database 152. The subscriber database 152 maintains each subscriber's mobile identification number (MIN) and electronic serial number (ESN). The MIN and ESN, taken together, uniquely identify each MS.

Typically, the MSC 130 also includes the visitor location register (VLR) 155. However, the VLR 155 may be a separate component of the system. The VLR 155 contains a local, temporary subscriber database 157 similar to the permanent subscriber database in the HLR 150. The information from the HLR 150 and the VLR 155 are used to authorize system access and to authorize billing to a particular billing account. The MSC 130 also interfaces with the AC 160 through the HLR 150.

The VLR 155 and MS 120 each have access to at least three pieces of information that make up the data used for authentication: the MIN of the mobile, the ESN of the mobile, and a shared secret data (SSD-A) associated with the mobile. The SSD-A is typically derived from an authentication key (A-Key). Each MIN and associated ESN represent a unique combination that may be used to identify a particular legitimate subscriber. The A-Key is a secret value that is unique to each individual subscription. For example, the A-Key may be a 64-bit cryptographic variable key stored in the memory of the MS 120. The A-Key may, for example, be entered once from the keypad of the MS 120 when the mobile station is first put into service to serve a particular subscriber. The A-Key typically remains unchanged unless its value has been compromised. The MIN and ESN may be transmitted over the air, but the A-Key may not be transmitted over the air.

In North American systems, authentication of an MS utilizes a process commonly referred to as the "CAVE" (cellular authentication and voice encryption) algorithm. The CAVE algorithm is a software-compatible non-linear mixing function having a 32-bit linear-feedback shift register (LFSR), sixteen 8-bit mixing registers, and a 256-entry lookup table. For further details on the CAVE algorithm refer to Common Cryptographic Algorithms cellular standard. Authentication requires both the MS 120 and the infrastructure components 112 of the system to execute the CAVE algorithm with a common set of data to generate an authentication signature. If the authentication signature generated by the MS 120 matches the authentication signature generated by the infrastructure components, then the identity of the MS 120 is authenticated and access to telephone service is granted. Otherwise, the attempt by the MS 120 to access the network is rejected.

The authentication can be performed by either a unique challenge or a broadcast challenge. In a unique challenge, a "RAND" is transmitted to a MS 120 that requests access to the system. The RAND is typically a randomly-generated value used in the authentication process. The RAND for a unique challenge is typically a 24-bit digital value. The MS 120 receives the RAND and executes the CAVE algorithm using the received RAND, the SSD-A, and other data to calculate an authentication signature. The authentication signature is typically an 18-bit digital value. The MS 120 transmits the RAND and the calculated authentication signature to the infrastructure components 112. The infrastructure components 112 similarly use the CAVE algorithm to calculate an authentication signature based upon the stored values for the SSD-A, the MIN, and the ESN. If the authentication signature received from the MS 120 matches the authentication signature calculated independently by the infrastructure components 112, then the MS 120 is granted access to service. Otherwise, the MS 120 is denied access to service.

In contrast, in a broadcast challenge, the infrastructure components broadcast a RAND to all MSs 120 on a dedicated broadcast channel (e.g., a cellular paging channel) rather than sending a RAND only to one MS 120 that has requested access. The broadcast challenge is sometimes referred to as the "global challenge." Typically, a new RAND will be generated and transmitted from time to time. When an MS 120 requests access to service, the MS 120 computes the authentication signature based on, the most recently broadcast RAND prior to any communication with the infrastructure components 112. In one example, the MS 120 transmits the 8 most significant bits of the RAND and the computed authentication signature to the infrastructure components 112 for verification. Since the infrastructure components 112 send the authentication signature together with the request for services, verification of the authentication signature can begin immediately upon the MS 120 requesting access to service, thereby minimizing delay in call processing.

While broadcast challenges result in faster ;call setup than unique challenges, clone telephones, or other fraudulent intruders have been able to gain unauthorized access to the system by a method commonly known as "replay attacks". A replay attack allows an intruder to appear to be a legitimate subscriber. As a result, the intruder can make calls that are billed to the legitimate subscriber. In accordance with a replay attack, an intruder monitors the information that is transmitted between an authorized MS 120 and the infrastructure components 112. The intruder stores the RAND and authorization signature transmitted by the authorized MS 120 to the infrastructure components 112. When the call ends, the intruder transmits a request for service containing the same RAND and authorization signature as sent previously by the legitimate subscriber. If the RAND has not changed since the authorized MS 120 calculated the intercepted authentication signature, then the subscriber who owns the authorized MS 120 would be billed for the intruder's use of service.

Prior efforts to prevent replay attacks such as using the dialed digits as input to the CAVE algorithm have been unsuccessful. For a mobile originated call a subset of the dialed digits is used as input to the CAVE algorithm instead of the MIN. Since dialed digits typically change with each call, using the dialed digits as an input to the CAVE algorithm results in a unique authentication signature for each call, unless the two calls are made to the same number. However, the authorization process typically will use a predetermined number of the last digits dialed, since these are most likely to be unique to each call. In many cases, the dialed digits of the authorized call can be appended to the dialed digits of the unauthorized call without adversely affecting the call. Therefore, the infrastructure will generate the same authentication signature as was generated for the call made by the authorized MS 120. Furthermore, fraudulent access to the system is available if the unauthorized MS intercepts and an operator assisted call or a call that is made through a directory assistance operator and uses the intercepted information (i.e., RAND and authentication signature) to access the system. Since many wireless service providers are now offering directory assistance service which connects the user directly to the number requested, many users will be dialing only "411" to get access to the system. Accordingly, by waiting for an operator assisted call to be made by an authorized user, a fraudulent user can gain unauthorized access to the system.

Therefore, there is a need in the wireless communication technology for an authentication process that is less susceptible to unauthorized access to the system.

SUMMARY OF THE INVENTION

A method and apparatus is disclosed which confirms the identity of a station in a communication network, such as a mobile telephone system. The disclosed method and apparatus is not susceptible to replay attacks. Furthermore, the disclosed method and apparatus implements an authentication process that has a relatively short delay. The disclosed method and apparatus includes the present invention as defined by the appended claims.

The disclosed method and apparatus comprises a first station (e.g., a mobile station) that communicates a first "security parameter" (e.g., a RAND) and an authentication signature to a second station (e.g., an infrastructure component) within the communication network. For the purpose of this disclosure, a security parameter is defined as any signal, pattern, or value that can be used as an input to a signature generation ("SG") algorithm, such as a conventional CAVE (cellular authentication and voice encryption) algorithm, to generate an authentication signature. An authentication signature is defined as a signal, pattern, or value which is output from an SG algorithm in response to one or more security parameters being input. It is preferable that each unique set of input security parameters produce an authentication signature that is unlike the authentication signature that would be output as the result of any other input security parameter set.

The second station receives the first security parameter and the authentication signature from the first station. If the first security parameter differs from each of a predetermined number of first security parameters previously received from the first station, then the second station performs conventional procedures to authenticate (i.e., confirm the identity of) the first station. Once the second station has authenticated the first station, the first station is granted access to the communication network. If the first security parameter is the same as one of the first security parameters transmitted by that first station in the most recent attempt by that first station to gain access, then the second station performs a "unique challenge".

In another embodiment of the disclosed method and apparatus, a determination is made as to whether a first station has previously accessed the communication network. If the first station has previously accessed the communication network, then a unique challenge procedure is initiated by the second station before access is granted to the first station.

BRIEF DESCRIPTION OF THE DRAWINGS

The above and other aspects, features and advantages of the invention will be better understood by referring to the following detailed description, which should be read in conjunction with the accompanying drawings, in which.

DETAILED DESCRIPTION OF THE INVENTION

A method and apparatus is disclosed for confirming the identify a mobile station in a mobile telephone system (MTS). The disclosed method and apparatus ensures that each mobile station (MS) can use a particular set of security values (such as a "RAND" or an authentication signature generated from a particular set of information, including a RAND) only once within a predetermined time. By ensuring that each MS can only use a particular security value once within a predetermined time, the risk of "replay attacks" is eliminated. The disclosed method and apparatus includes the claimed present invention. However, the scope of the invention should be determined exclusively by the appended claims.

Figure 1:
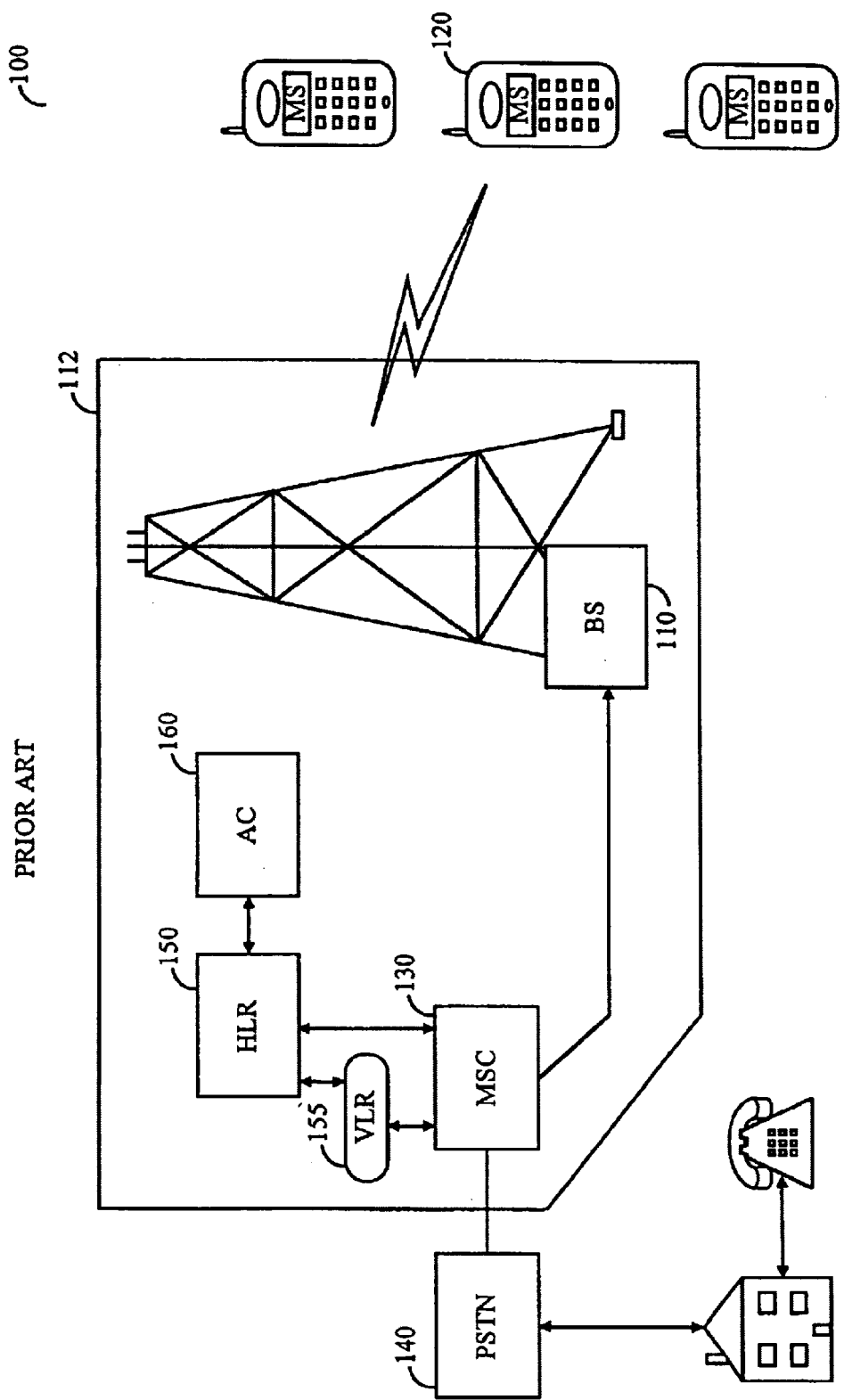
FIG. 1 is a pictorial diagram of a typical mobile communication system having one or more mobile stations.
Figure 2:
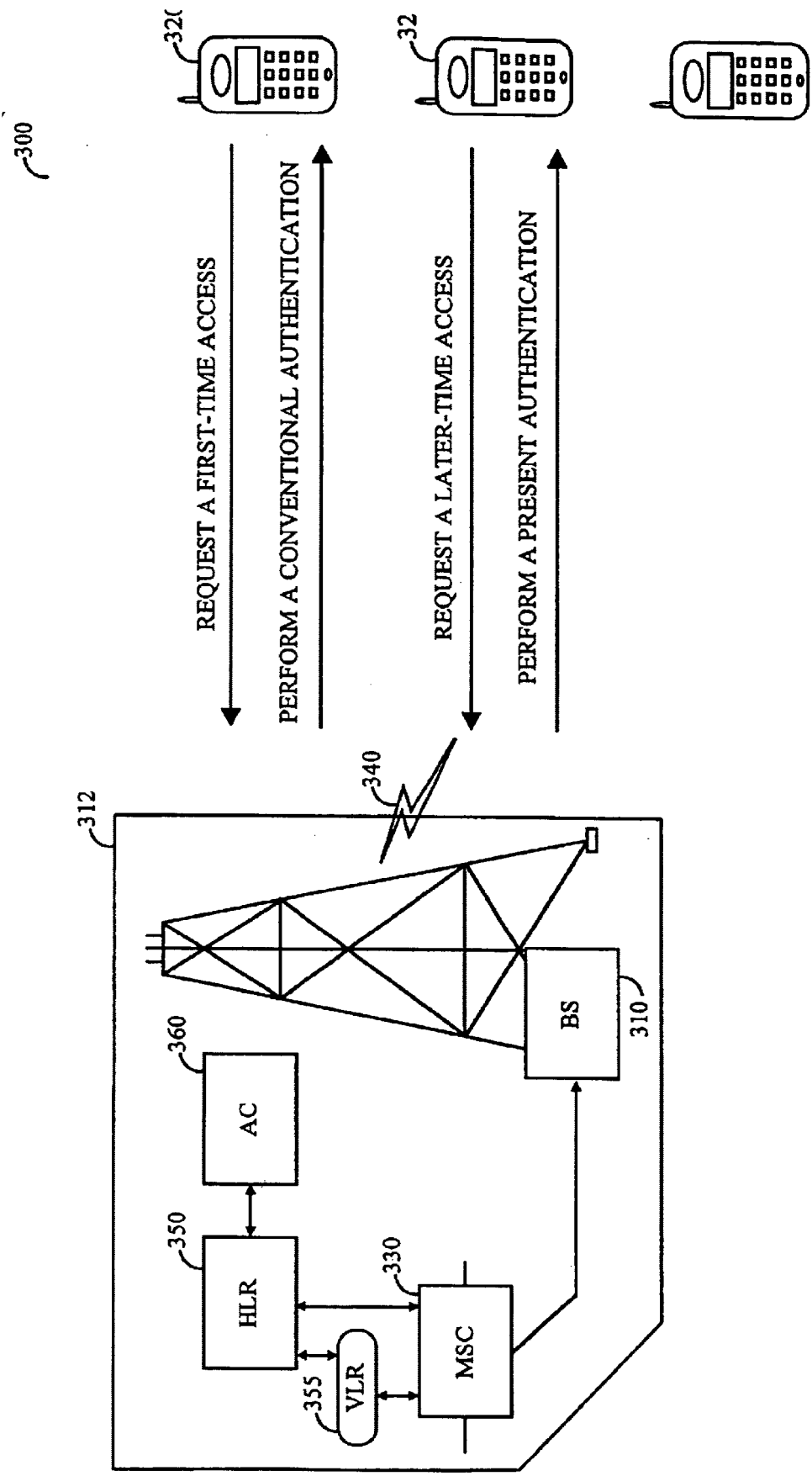
FIG. 2 is a pictorial diagram of a challenge/response dialog between a mobile switching center and a mobile station.

FIG. 2 illustrates a challenge/response dialog between infrastructure components 312 of an MTS 300 and an authorized MS 320 (e.g., an MS that has a valid billing account with the service provider who operates the MTS 300). An MS 321 is an intruder (i.e., an unauthorized user). In one embodiment of the disclosed method and apparatus, the infrastructure components 312 include a base station (BS) 310, a mobile switching center (MSC) 330, a home location register (HLR) 350, an authentication center (AC) 360, and a visitor location register (VLR) 355. The MTS 300 is preferably capable of performing both unique and broadcast challenges. The infrastructure components 312 transmit (via the BS 310) a broadcast security value (such as a "broadcast RAND") to all MSs 320 over an air link 340. The broadcast security value is preferably a randomly generated value that is used in a "broadcast authentication" process, as is described below. From time to time, the broadcast security value changes, and the new broadcast security value is broadcast to all MS's 320. As will become apparent from the following description, there is a tradeoff between changing the broadcast security value more frequently to reduce the number of unique challenges required and changing the broadcast security value less frequently to reduce the overhead required to generate and broadcast new broadcast security values. In the case in which the broadcast security value is a RAND, the disclosed method and apparatus preferably operates in compliance with any industry standards that dictate how often a RAND is to be changed.

When a particular MS 320 attempts to access telephone service for the first time through the infrastructure components 312, the MS 320 must first receive the broadcast security value. The broadcast security value is provided as one of several inputs to a signature generation ("SG") algorithm, such as a CAVE (cellular authentication and voice encryption) algorithm, to generate an authentication signature. The other inputs to the SG algorithm preferably include the mobile identification number ("MIN"), the electronic serial number ("ESN"), and the shared secret data ("SSD-A") values associated with the MS 320. Each particular pair of ESN and MIN values identifies a particular MS. The SSD-A value that is generated from a "key" value using a secret algorithm. The key value and the SSD-A value are never transmitted over the air.

Once the MS 320 has generated the authentication signature, the MS 320 transmits over the air to the infrastructure components 312, a set of security values. In accordance with one embodiment of the disclosed method and apparatus, the set of security values include: (1) the authentication signature, (2) either the entire broadcast security value used as input to the SG, a portion of that broadcast security value, or some value which represents that broadcast security value, (3) the ESN, and (4) the MIN used to generate that authentication signature. Since the SSD-A value and the particular SG algorithm are not known to anyone who might intercept this information, there is no possibility that an intruder would be able to use this information in the future to independently generate an authentication signature when the security value changes.

The infrastructure components 312 note at least some of the values within the set of the security values transmitted. For example, in one embodiment, the infrastructure components 312 note which broadcast security value was used by the MS 320 to generate the authentication signature. Alternatively, the security value noted by the infrastructure components 312 is the authentication signature itself. In one embodiment of the disclosed method and apparatus, the infrastructure components 312 store a portion of the security information, such as the broadcast security value or the authentication signature. In a particular embodiment of the disclosed method and apparatus, the infrastructure components 312 are equipped with sufficient memory capacity to store several security values (or values representing the value of the security value) for each MS 320. Alternatively, the infrastructure components 312 may only have memory allocated for one storing one security value (or value representing the value of the security value) for each MS 320.

The next time the MS 320 attempts to access telephone service, the MS 320 uses the then current broadcast security value and the MIN, ESN, and SSD-A to calculate an authentication signature. If the broadcast security. value has changed since the last attempt to access the system, then the MS 320 will transmit the ESN and MIN with the new broadcast security value (or representative value) and authentication signature. In this case, the process will be essentially identical to the case in which the MS 320 makes its first attempt to access the system.

However, if the broadcast security value has not changed since the mobile's last attempt to access the system, then the values of the computed authentication signature and broadcast security value will be the same as those values used for the previous attempt to gain access to the system. That is, given the same input to the SG, the output from the SG will be the same for the second access attempt.

The MS 320 transmits the broadcast security value (or representative value), the calculated authentication signature, and ESN and MIN to the infrastructure components 312 over the air link 340a. The infrastructure components 312 compare one or more of the received set of security values with stored security values (or representative values) previously received by the infrastructure components 312 from that MS 320. For example, in one embodiment of the disclosed method and apparatus, the infrastructure components 312 compare the broadcast security value received with broadcast security values previously received from that MS 320. Alternatively, the infrastructure components 312 can check the entire set of information that is sent by the MS 320. In yet another alternative some portion of that information other than the security value or representative value (such as the authentication signature) is checked, as long as the information that is checked changes each time the MS 320 uses a different broadcast security value in the access attempt. Since, in this case, the infrastructure components 312 have previously received the same security information from the MS 320 (e.g., a RAND or authentication signature having the same value), the infrastructure components 312 will require additional verification of the identity of the MS 320 before that MS 320 will be allowed to access the system. In accordance with one embodiment of the disclosed method and apparatus, additional verification is performed by having the infrastructure components 312 initiate a unique challenge authentication procedure. Alternatively, the infrastructure components 312 could force a change in the broadcast security value and require the MS 320 to respond to the broadcast challenge using the new security value value. In yet another embodiment, another method may be used to force the MS 320 to verify its identity.

If the additional verification procedure indicates that the MS 320 is authorized (e.g., a successful outcome results from the unique challenge) the MS 320 is considered to be a legitimate subscriber and not an intruder (e.g., MS 321). Accordingly, the infrastructure components 312 grants the MS 320 access to telephone service.

However, if an unauthorized MS 321 captures authentication data (e.g., a RAND, authentication signature, and ESN and MIN) by monitoring transmissions from an authorized MS 320, that unauthorized MS 321 would fail the additional verification process. For example, if the infrastructure components 312 requested that the MS 321 respond to a unique challenge, that MS 321 could not respond properly, since the MS 321 would have to independently generate a new authentication signature from the unique challenge security value that is provided from the infrastructure components 312. Alternatively, if the infrastructure components 312 changed the broadcast security value and then requested the MS 321 to respond to the broadcast challenge using the new broadcast security value, the MS 321 could not do so successfully. This is because the broadcast challenge would now require independent generation of a new authentication signature based upon the new broadcast security value.

It should be understood that the functions of each of the particular components within the infrastructure components 312 may vary from one embodiment of the disclosed method and apparatus to another. However, each such component is essentially conventional with the exception of the functions that are performed to determine whether an MS 320 has previously attempted to access the system, and the process of requesting a further verification from the MS 320, if so.

In one embodiment of the disclosed method and apparatus in which the infrastructure components 312 include the base station 310, the MSC 330, the HLR 350, the AC 360, and the VLR 355, the MSC 330 generates a broadcast security value. This broadcast security value is communicated to the BS 310. The BS 310 transmits the broadcast security value to the MS 320. When the MS 320 attempts to access communication services from the network 300, the MS 320 sends the following information back to the BS 310. The MS 320 sends a portion of the broadcast security value (or a value that is generated based upon the value of the security value), a copy of the MIN, the ESN, and the authentication signature that was generated by the MS 320 using these parameters. Each of these parameters are communicated to the HLR 350. The HLR 350 determines whether the MS 320 is registered in the system 300. If the HLR 350 determines that the MS 320 is registered, then the parameters communicated to the HLR 350 are communicated to the AC 360. The AC 360 checks whether the MS 320 (which is identified by the MIN and ESN) has previously attempted to access the system using the same broadcast security value. If not, then the AC 360 uses the MIN, the ESN, the SSD-A, and the broadcast security value to independently generate the authentication signature. The AC 360 then checks to ensure that the authentication signature that it generated is the same as the authentication signature that was received from the MS 320.

If the authentication signature generated by the AC 360 does not match the authentication signature that was received from the MS 320, or if the AC 360 determines that the MS 320 has already attempted to access service from the network using the same broadcast security value, then the AC will generate a unique challenge security value. The AC 360 will use the unique challenge security value to generate a new authentication signature (a "unique authentication signature"). The unique challenge security value and the unique authentication signature are both communicated to the MSC 330. The MSC 330 communicates only the unique challenge security value to the BS 310. The BS 310 transmits the unique challenge security value to the MS 320. The MS 320 then responds with a unique authentication signature that the MS 320 has independently calculated using the MIN, ESN, unique challenge security value, and SSD-A.

The BS 310 receives the unique authentication signature from the MS 320. The BS 310 then communicates the signature to the MSC 330. The MSC 330 compares the unique authentication signature received from the MS 320 with the unique authentication signature that was provided to the MSC 330 from the AC 360. If they match, then the MS 320 is assumed to be legitimate.

If the MSC 330 determines that the MS 320 is a visitor, then the VLR 355 is used to perform the functions that would otherwise be performed by the HLR 350.

However, it should be clear that the functions that are described above as being performed by one component, such as the AC 360, may be performed equally well by another component, such as the HLR 350, VLR 355, or MSC 330.

Figure 3:
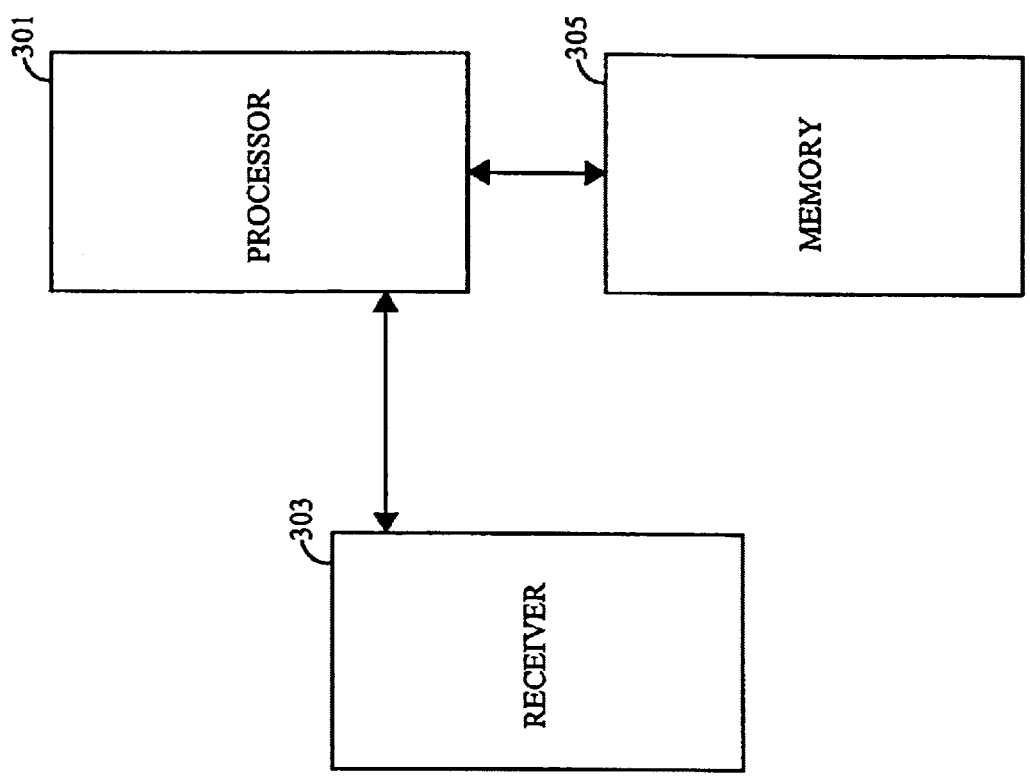
FIG. 3 is an illustration of the components of the MSC.

FIG. 3 is an illustration of the components of the MSC 330. As shown in FIG. 3, the MSC preferably includes a processor 301, a receiver 303, and a memory 305. The receiver is any type of receiving device that can receive signals from an external source. In accordance with one embodiment of the disclosed method and apparatus, the receiver is a conventional receiver, such as is commonly found in equipment that is coupled to a base station via land lines. The processor 301 is coupled to the receiver 303. The processor is shown here as a single processor. However, it will be understood by those skilled in the art that the processor merely represents processing functions may be either performed by a single processing entity, such as a microprocessor, or which is performed by a plurality of processing entities distributed throughout the infrastructure components 312. Nonetheless, the processing required is such that a conventional microprocessor and/or digital signal processor can perform all of the necessary functions of the disclosed method and apparatus.

Figure 4:
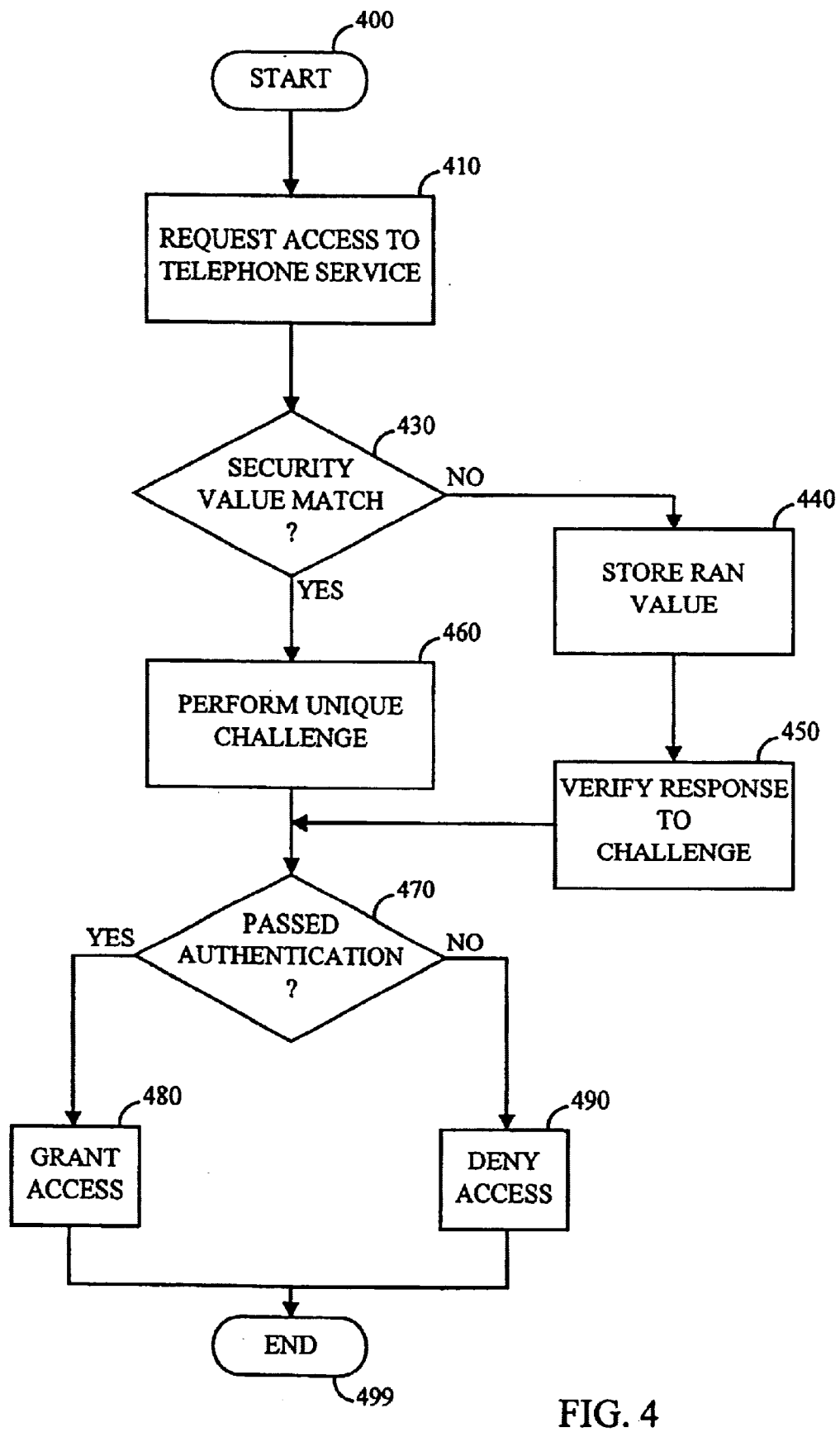
FIG. 4 is a flow chart describing the steps performed during operation of an authentication process.

FIG. 4 is a flow chart describing the steps executed during an authentication process in one embodiment of the disclosed method and apparatus. The system described in FIG. 2 may be used to implement the steps of FIG. 4. As shown in FIG. 4, the process begins at step 400. At step 410, when a particular MS 320 attempts to access telephone service, the MS 320 transmits a set of security values, including identification data (e.g., MIN/ESN), a previously received security value, and an associated authentication signature. The MS 120 may also transmit other data, if desired. Typically, the MS 320 obtains the previously received broadcast security value from the infrastructure components 312 during a previous broadcast by the MSC 330, or during a previous unique challenge procedure with the infrastructure components 312. At step 430, the infrastructure components 312 determine whether the MS 320 has previously obtained service from the infrastructure components 312 using the same set of security values. In an alternatively embodiment, the infrastructure components 312 check whether some portion of the set of security value was previously used by the MS 320 to access service.

If the infrastructure components 312 determine that the MS 320 has not previously accessed service using the same set of security values, then at step 440, the infrastructure components 312 store the security value received from the MS 320. At step 450, the infrastructure components 312 verify the value of the authorization signature received from the MS 320. That is, a check is made of the value of the authorization signature that is expected (e.g., the value calculated independently by the infrastructure components 312 using the same inputs to the SG as were used by the MS 320). After verifying the authorization signature, the process proceeds to step 470.

If, on the other hand, the infrastructure components 312 determine at step 430 that the MS 320 has previously accessed service using the same security value, then the process proceeds to step 460. At step 460 the infrastructure components 312 perform an additional verification of the MS 320, such as by requesting a response from the MS 320 to a unique challenge procedure. As noted above, the unique challenge procedure involves the exchange of at least a unique security value from the infrastructure components 312 to the MS 320, and a unique challenge signature from the MS 320 to the infrastructure components 312.

At step 470, the infrastructure components 312 determine whether the MS 320 has passed the authentication procedures performed at the step 450 or 460. This determination is accomplished by executing the same SG algorithm (e.g., the CAVE algorithm) as that executed by the MS 320 to compute an expected authentication signature. The infrastructure components 312 compare the expected authentication signature with the authentication signature computed by the MS 320. If the two signatures match, then the process proceeds to step 480 and the MS 320 is granted access to telephone service. If the two signatures do not match, then the process proceeds to step 490 and the MS 320 is denied access to service. The process terminates at step 499.

In view of the foregoing, it will be appreciated that the invention overcomes the long-standing need for a wireless system and method having an intrusion-resistant authentication procedure. By performing the authentication process of this invention, the probability of intrusion is minimized. To defeat the authentication process of this invention, an intruder would have to obtain not only the authentication data, but acquire the SSD-A which is not transmitted over the air. The invention may be embodied in other specific forms without departing from its spirit or essential characteristics. The described embodiment is to be considered in all respects only illustrative and not restrictive. The scope of the invention is, therefore, indicated by the appended claims rather by the foregoing description. All changes which fall within the meaning and range of equivalency of the claims are to be embraced within their scope.

We claim:

1. A system for preventing replay attacks in a communication network, the system comprising at least one station which is configured to:

receive a public security parameter and an authentication signature from a mobile station, the authentication signature having been generated using both the public security parameter and a private security parameter;

compare the public security parameter communicated by the mobile station to at least one public security parameter previously used by the mobile station; and send a new public security parameter to the mobile station if the public security parameter communicated by the mobile station was previously used and request the mobile station to generate and transmit to the at least one station a new authentication signature based upon the private security parameter and the new public security parameter.

2. The system of claim 1, wherein the at least one station is a combination of infrastructure components.

3. The system of claim 2, wherein the combination of infrastructure components includes:

a base station;

a mobile switching center; and a home location register.

4. The system of claim 2, further including:

an authentication center; and a visitor location register.

5. A system for authenticating a mobile station in a communication network, the system comprising at least one station for:

receiving a public security parameter and an authentication signature from the mobile station, wherein the authentication signature is generated using both the public security parameter and a private security parameter;

comparing the public security parameter communicated by the mobile station to at least one public security parameter previously received from the mobile station; and demanding an additional verification of identify from the mobile station if the public security parameter communicated by the mobile station matches a previously received public security parameter of the mobile station.

6. A station for authenticating a mobile station in a communication network, the station comprising:

means for receiving a public security parameter and an authentication signature from the mobile station, wherein the authentication signature is generated using both the public security parameter and a private security parameter;

means for comparing the public security parameter communicated by the mobile station to at least one public security parameter previously received from the mobile station; and means for performing an additional verification of the identify of the mobile station if the public security parameter communicated by the mobile station matches a previously received public security parameter of the mobile station.

7. A method of authenticating a subscriber in a communication network, the method comprising the steps of:

performing a public challenge procedure;

receiving a broadcast security parameter and an authentication signature from a subscriber who responds to the public challenge procedure;

determining whether the broadcast security parameter transmitted by the subscriber matches a previously transmitted parameter from the subscriber, wherein the previously transmitted parameter is received from a previous public challenge procedure; and if the broadcast security parameter is different than the previously transmitted parameter, then generating an authentication signature using the broadcast security parameter transmitted by the subscriber as an input to a signature generation algorithm and checking whether the generated authentication signature matches the authentication signature received from the subscriber;

if the broadcast security parameter matches a broadcast security parameter previously transmitted by the subscriber, then performing a private challenge procedure.

* * * * *